United States Patent
Ishizaki et al.

(10) Patent No.: US 9,626,037 B2
(45) Date of Patent: *Apr. 18, 2017

(54) DISPLAY DEVICE

(71) Applicant: Japan Display Inc., Tokyo (JP)

(72) Inventors: Koji Ishizaki, Aichi (JP); Kouji Noguchi, Kanagawa (JP); Takayuki Nakanishi, Aichi (JP); Yasuyuki Teranishi, Aichi (JP); Takeya Takeuchi, Aichi (JP)

(73) Assignee: Japan Display Inc., Tokyo (JP)

( * ) Notice: Subject to any disclaimer, the term of this patent is extended or adjusted under 35 U.S.C. 154(b) by 121 days.

This patent is subject to a terminal disclaimer.

(21) Appl. No.: 14/741,620

(22) Filed: Jun. 17, 2015

(65) Prior Publication Data
US 2015/0286337 A1    Oct. 8, 2015

Related U.S. Application Data

(63) Continuation of application No. 12/820,685, filed on Jun. 22, 2010, now Pat. No. 9,092,087.

(30) Foreign Application Priority Data

Jun. 30, 2009   (JP) ................................ 2009-155201

(51) Int. Cl.
*G06F 3/038*   (2013.01)
*G06F 3/041*   (2006.01)
(Continued)

(52) U.S. Cl.
CPC ............ *G06F 3/0416* (2013.01); *G06F 3/044* (2013.01); *G06F 3/045* (2013.01); *G06F 3/0412* (2013.01);
(Continued)

(58) Field of Classification Search
None
See application file for complete search history.

(56) References Cited

U.S. PATENT DOCUMENTS 8,063,896 B2   11/2011   Nishimura
8,471,793 B2   6/2013    Irie et al.
(Continued)

FOREIGN PATENT DOCUMENTS

JP   06-265939   9/1994
JP   07-182107   7/1995
(Continued)

OTHER PUBLICATIONS

Japanese Office Action issued Jan. 22, 2013 in corresponding Japanese Patent Application No. 2009-155201.

*Primary Examiner* — Joseph Haley
*Assistant Examiner* — Ifedayo Iluyomade
(74) *Attorney, Agent, or Firm* — K&L Gates LLP

(57) ABSTRACT

A display device includes: a display functional layer that can change display for each pixel in accordance with an application voltage; a plurality of driving electrodes separately disposed in one direction; a plurality of pixel signal lines to which pixel signals used for applying the application voltage to the display functional layer in accordance with an electric potential difference from the display reference electric potential are applied; a plurality of detection electrodes that are separately disposed in a direction other than the one direction, are coupled with the driving electrodes as electrostatic capacitance, generate detection electric potentials in response to the detection driving signal, and change the detection electric potential in accordance with approach of a detection target object; and a pixel signal control unit that controls the pixel signals so as to include pixel signals having different polarities during the display period.

14 Claims, 14 Drawing Sheets

(51) Int. Cl.
   *G09G 3/36* (2006.01)
   *G06F 3/044* (2006.01)
   *G06F 3/045* (2006.01)
   *G06K 9/00* (2006.01)

(52) U.S. Cl.
   CPC ............. *G06K 9/0051* (2013.01); *G09G 3/36* (2013.01); *G09G 3/3607* (2013.01); *G09G 3/3614* (2013.01); *G09G 3/3655* (2013.01); *G09G 3/3659* (2013.01); *G09G 3/3696* (2013.01); *G06F 2203/04101* (2013.01); *G06F 2203/04112* (2013.01); *G09G 2310/0248* (2013.01); *G09G 2310/0251* (2013.01); *G09G 2310/0262* (2013.01); *G09G 2320/0204* (2013.01); *G09G 2320/0209* (2013.01); *G09G 2320/029* (2013.01); *G09G 2320/0219* (2013.01)

(56) References Cited

U.S. PATENT DOCUMENTS

| 2008/0218648 | A1* | 9/2008 | Koshihara | G06F 3/0412 349/37 |
| 2009/0115772 | A1* | 5/2009 | Shiomi | G09G 3/342 345/214 |
| 2009/0135158 | A1 | 5/2009 | Takahashi et al. | |

FOREIGN PATENT DOCUMENTS

| JP | 2005-249862 | 9/2005 |
| JP | 2006-040289 | 2/2006 |
| JP | 2007-058211 | 3/2007 |
| JP | 2007-524126 | 8/2007 |
| JP | 2008-9750 | 1/2008 |
| JP | 2008-185915 | 8/2008 |

* cited by examiner

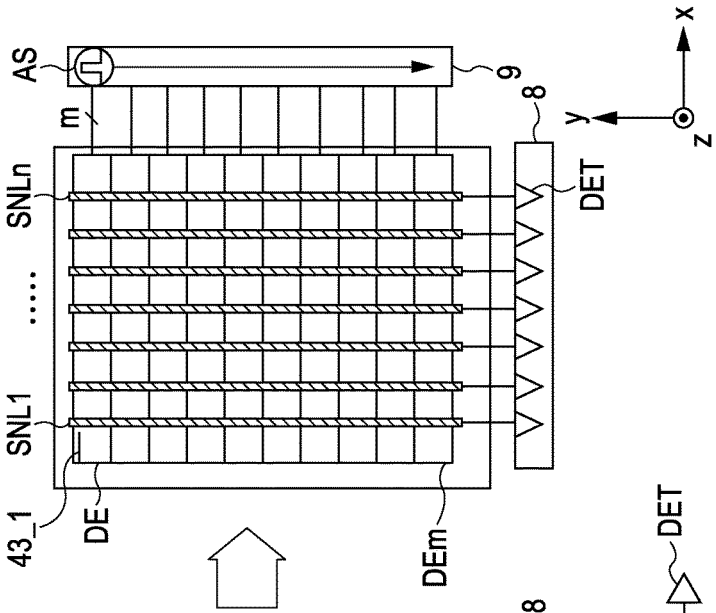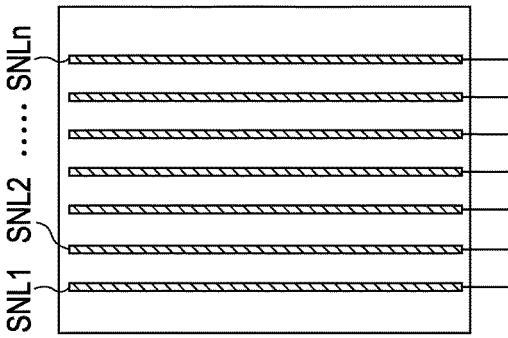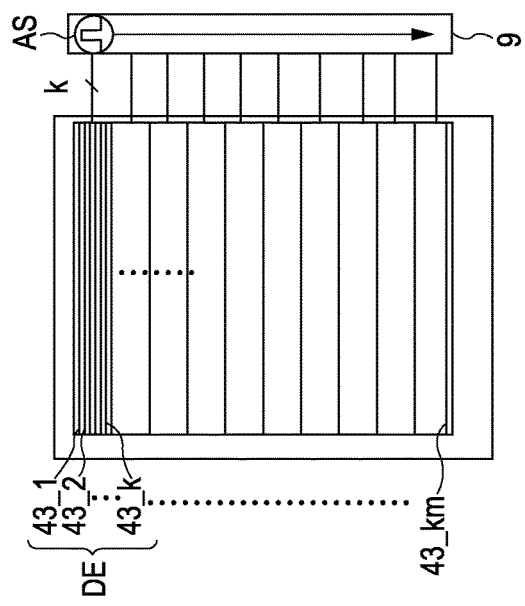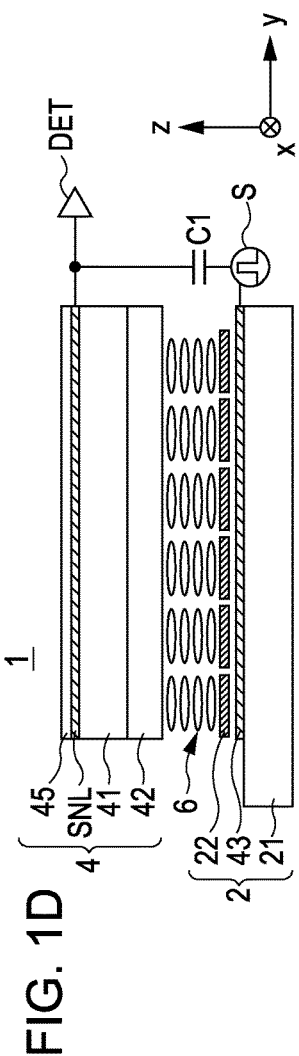

Vcom

SIGNAL (PIXEL)

R1  B1  G2
 G1  R2  B2

Vcom ─────────────────────────

Vcom ⎯⎯⎯⎯⎯⎯⎯⎯⎯⎯⎯⎯⎯⎯⎯⎯⎯⎯⎯⎯⎯⎯⎯⎯⎯⎯⎯⎯⎯

SIGNAL (PIXEL)

R1-1 B1-1 G2-1
R1-2 B1-2 G2-2

G1-1 R2-1 B2-1
G1-2 R2-2 B2-2

DISPLAY DEVICE

CROSS REFERENCES TO RELATED APPLICATIONS

The present application is a continuation application of U.S. Application No. 12/820,685, filed Jun. 22, 2010, which application claims priority to Japanese Priority Patent Application JP 2009-155201 filed in the Japan Patent Office on Jun. 30, 2009, the entire content of which is hereby incorporated by reference.

BACKGROUND

The present application relates to a sensor built-in display device in which an electrode, to which a driving signal of sensor detection is applied, is additionally used as an electrode to which a display reference electric potential is applied.

Contact detecting devices that are so-called touch panels are known. The touch panels, that are formed so as to be overlapped with a display panel, allow information input replacing ordinary buttons by displaying various buttons as an image on a display surface. When this technology is applied to small-sized mobile devices, disposition of display and disposition of buttons can be commonly used. Accordingly, a significant advantage of enlarging the screen, saving the space of an operation unit, or a decrease in the number of components is acquired.

As described above, generally a "touch panel" represents a contact detecting device having a panel shape that is built in the display device.

However, when the touch panel is arranged on a liquid crystal panel, the entire thickness of a liquid crystal module is increased. Thus, for example, in Japanese Unexamined Patent Application Publication No. 2008-9750, a liquid crystal display device, to which an electrostatic capacitive-type touch panel is added, having a structure appropriate for decreasing the thickness is proposed.

An electrostatic capacitive-type touch sensor has a plurality of driving electrodes and a plurality of detection electrodes that form electrostatic capacitance together with the plurality of driving electrodes. The detection precision of a sensor is in proportion to the number of the driving electrodes and the detection electrodes. However, in a case where sensor output lines are arranged in addition to the detection electrodes, the number of wirings becomes vast. Accordingly, in order to allow detection electrodes to function as sensor output lines, a driving method in which one of the plurality of driving electrodes is AC driven, and the driving electrode that is AC driven is shifted in a direction (hereinafter, referred to as a scanning direction), in which the driving electrodes are aligned at a constant pitch, becomes a mainstream. In a case where a technique of scanning the driving electrodes that are AC driven in one direction is used, when an electric potential change of the detection electrode is observed in follow-up of the scanning, contact or proximity of a detection target object to the touch panel surface can be detected based on the scanning position in which an electric potential change occurs.

SUMMARY

In a case where such a touch panel is applied to a display device, when the entire device is formed to be thin, the AC-driven driving electrode can easily interfere electrically with signal lines and electrodes, which are used for display driving, for detection driving.

There are cases where the signal lines and the electrodes, which are used for display driving, are driven due to application of pixel signals to the signal lines and the electrodes for display or AC inversion of the electric potential reference (display reference electric potential) of a display voltage applied to a display functional layer such as a liquid crystal layer. Accordingly, there are cases where the change in the electric potential for such display causes the electric potential of the detection electrode to fluctuate through the driving electrode and becomes a noise source in object detection.

In particular, there are cases where the display reference electric potential of the display functional layer is driven in an AC inversion manner, and an extreme grayscale display is performed such as the case of white display or black display by using a pixel signal that uses the display reference electric potential that is driven in the AC inversion manner as a reference. In such cases, there are cases where the DC electric potential level of the detection electrode is changed under the influence of the pixel signal so as to be a noise at the time of detection, and such a change blocks high-precision objection detection. In addition, there are cases where the detection precision is lowered depending on a force of interference between the electrodes in halftone grayscale display other than the white display and the black display.

It is desirable to provide a touch sensor-built-in display device capable of preventing or suppressing a decrease in the precision of object detection due to pixel signals.

According to an embodiment, there is provided a display device including a display functional layer, a plurality of driving electrodes, a plurality of pixel signal lines, a plurality of detection electrodes, and a pixel signal control unit.

The display functional layer is configured so as to change display for each pixel in accordance with an application voltage.

The plurality of driving electrodes are disposed in one direction so as to be separated from one another, and to the plurality of driving electrodes, a constant display reference electric potential is applied during a display period in which display is performed in a pixel arrangement along the one direction and a detection driving signal is applied when detection scanning is performed by changing the display reference electric potential to another electric potential.

To the plurality of pixel signal lines, pixel signals used for applying the application voltage to the display functional layer in accordance with an electric potential difference from the display reference electric potential are applied.

The plurality of detection electrodes are disposed so as to be separated from one another in a direction other than the one direction, are coupled with the plurality of the driving electrodes as electrostatic capacitance, generate detection electric potentials in response to the detection driving signal, and change the detection electric potential in accordance with approach of a detection target object.

The pixel signal control unit controls the plurality of pixel signals applied to the plurality of pixel signal lines so as to include pixel signals having different polarities during the display period.

Under the above-described configuration, the detection scanning is not performed during the fixed display period. Accordingly, a fixed display reference electric potential is applied to the plurality of driving electrodes. Then, under the control of the pixel signal control unit, during the display period, a plurality of pixel signals applied to the plurality of pixel signal lines include pixel signals having different polarities. Accordingly, changes in the electric potentials of the plurality of pixel signal lines are offset at the ratio of inclusion of the pixel signals having different polarities. Accordingly, even in a case where each driving electrode is electrically coupled with the plurality of pixel signal lines, the electric potential of the driving electrode is not changed due to the pixel signal or the change in the electric potential is suppressed. As a result, the change in the electric potential of the detection electrode that is capacitively coupled with each driving electrode due to the pixel signal, that is, a noise component of object detection is prevented or suppressed.

According to an embodiment, a touch sensor built-in display device capable of preventing or suppressing a decrease in the precision of object detection due to pixel signals can be provided.

Additional features and advantages are described herein, and will be apparent from the following Detailed Description and the figures.

BRIEF DESCRIPTION OF THE FIGURES

FIGS. 1A to 1D are plan views specialized for the disposition of electrodes of a display device according to an embodiment and circuits used for driving the electrodes and detection.

DETAILED DESCRIPTION

The present application will be described in detail below with reference to the drawings according to an embodiment.

1. First Embodiment

This is an embodiment in which pixel signals having different polarities are included within 1 H period. As a preferred embodiment, a case where the polarity is alternately inverted is described as an example.

2. Second Embodiment

This is an embodiment representing an example of driving two areas (or two pixels that form a pixel pair) within one pixel by using a same pixel signal.

3. Modified Examples

1. First Embodiment

Basic Configuration of Display Device

Figure 2:
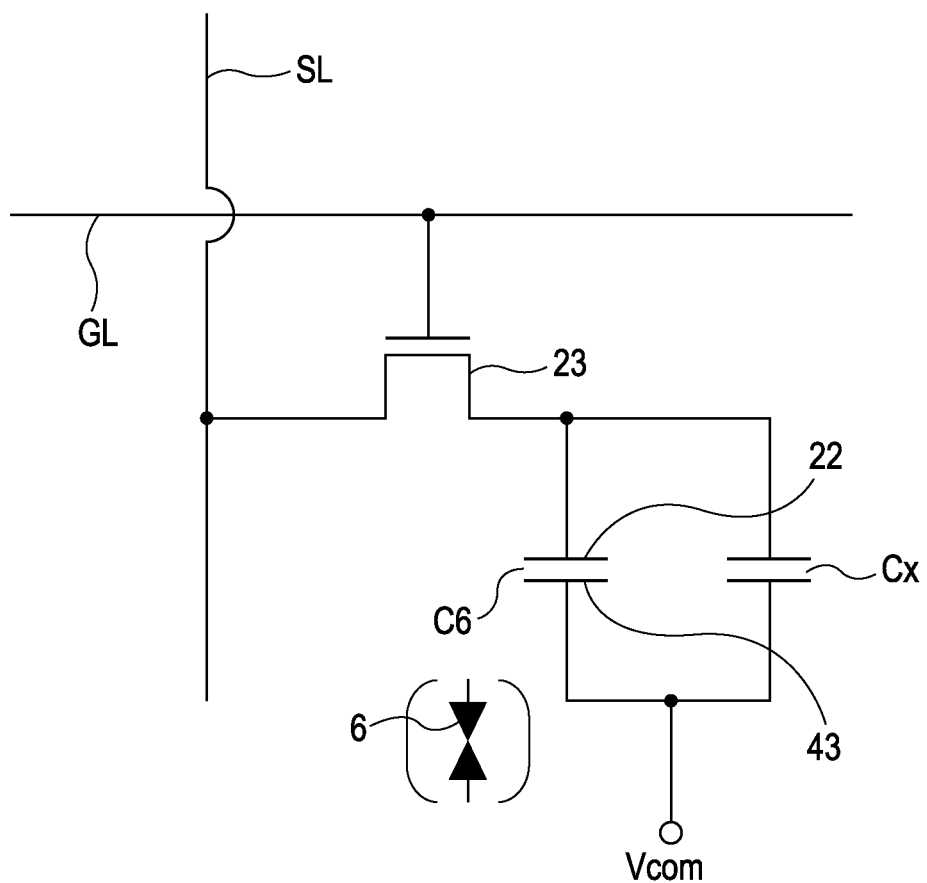
FIG. 2 is an equivalent circuit diagram of a pixel.

FIGS. 1A to 1C show plan views specialized for the disposition of electrodes of a display device according to this embodiment and circuits used for driving the electrodes or detection. In addition, FIG. 1D shows a schematic cross-sectional structure of the display device according to this embodiment. FIG. 1D shows a cross-section of six pixels, for example, arranged in a row direction (the direction of a pixel display line). FIG. 2 is an equivalent circuit diagram of a pixel.

The display device shown in FIGS. 1A to 1D is a liquid crystal display device that includes a liquid crystal layer as a "display functional layer".

The liquid crystal display device has an electrode common to a plurality of pixels and an electrode (driving electrode) to which a common electric potential Vcom, which provides a reference voltage of signal voltages used for grayscale display of each pixel, is applied on the side of one substrate of two substrate elements opposing each other with the liquid crystal layer interposed therebetween.

In FIG. 1D, in order to allow the structure of the cross-section to be easily viewed, a driving electrode, and a pixel electrode, and a detection electrode that are major configurations of this embodiment are hatched, and other portions (substrates, an insulating film, a functional layer, and the like) are not hatched. The not hatching of the other portions are the same in other structural diagrams of the cross-section described later.

In the liquid crystal display device 1, pixels PIX shown in FIG. 2 are disposed in a matrix pattern. Each pixel PIX, as shown in FIG. 2, has a thin film transistor (TFT; hereinafter denoted by TFT 23) as a selection device of a pixel, an equivalent capacitor C6 of the liquid crystal layer 6, and a retention capacitor (additional capacitance) Cx. One electrode of the equivalent capacitance C6 representing the liquid crystal layer 6 is a pixel electrode 22 that is disposed in the matrix pattern so as to be separated for each pixel, and the other electrode is a driving electrode 43 that is common to a plurality of pixels.

The pixel electrode 22 is connected to one of the source and the drain of the TFT 23, and a pixel signal line (hereinafter, referred to as a source line SL) is connected to the other of the source and the drain of the TFT 23. The source line SL is connected to a vertical driving circuit (source driver) to be described later, and a pixel signal is supplied to the source line SL from the vertical driving circuit.

The gate of the TFT 23 is configured to be electrically common to all the pixels PIX aligned in the row direction, that is, the horizontal direction of a display screen, and whereby a display scanning line is formed. A gate pulse that is output from the vertical driving circuit not shown in the figure and is used for opening or closing the gate of the TFT 23 is supplied to the display scanning line, and thus, the display scanning line is referred to as a gate line GL hereinafter.

As shown in FIG. 2, the retention capacitor Cx is connected to the equivalent capacitor C6 in a parallel manner. The equivalent capacitance C6 has insufficient accumulation capacitance. Thus, the retention capacitor Cx is disposed so as to prevent a decrease in the write electric potential due to a leakage current of the TFT 23 or the like. In addition, the addition of the retention capacitor Cx also contributes to prevention of flicker and improvement of uniformity in screen luminance.

When viewed from the cross-sectional structure (FIG. 1D), the liquid crystal display device 1 has a substrate (hereinafter, referred to as a driving substrate 2) in which the TFT 23 shown in FIG. 2 is formed in an area not shown in the cross-section and to which a pixel driving signal (pixel signal voltage) is supplied. In addition, the liquid crystal display device 1 includes an opposing substrate 4 disposed so as to face the driving substrate 2 and a liquid crystal layer 6 interposed between the driving substrate 2 and the opposing substrate 4.

The driving substrate 2 includes a TFT substrate 21 (a substrate body portion is formed from glass or the like) as a circuit substrate in which the TFT 23 shown in FIG. 2 is formed, a driving electrode 43 that is formed on the TFT substrate 21, and a plurality of pixel electrodes 22. The plurality of pixel electrodes 22, although not shown in FIGS. 1A to 1D, includes the plurality of pixel electrodes 22 that are disposed in a matrix pattern.

In the TFT substrate 21, a display driver (see FIG. 4 to be described later), not shown in the figure, used for driving each pixel electrode 22 is formed. In addition, in the TFT substrate 21, the TFT 23 and wires such as the source line SL and the gate line GL, which are shown in FIG. 2, are formed. A contact detecting unit 8 may be formed in the TFT substrate 21.

The opposing substrate 4 includes a glass substrate 41, a color filter 42 that is formed on one surface of the glass substrate 41, and a driving electrode 43 that is formed on the color filter 42 (the liquid crystal layer 6 side). The color filter 42 is configured by periodically arranging color filter layers, for example, of three colors of red (R), green (G), and blue (B), and one of the three colors of R, G, and B is assigned to each pixel PIX (the pixel electrode 22). There are cases where a pixel to which one color is assigned is referred to as a sub pixel, and sub pixels of three colors of R, G, and B are referred to as a pixel. However, here, such a sub pixel is also denoted by a pixel PIX.

The driving electrode 43 is used also as a driving electrode DE of a touch detecting sensor that configures a part of a touch sensor performing a touch detecting operation.

To the driving electrode 43, a fixed common electric potential Vcom as a reference electric potential of a pixel voltage that is supplied to the pixel electrode 22 so as to apply an electric field to the liquid crystal layer 6 is applied. On the other hand, the driving electrode 43 is used also as the driving electrode DE of the touch detecting sensor. Accordingly, an AC pulse signal supplied from an AC signal source AS shown in FIGS. 1A to 1D is applied to the driving electrode 43 when touch detecting scanning is performed.

On the other surface (the display surface side) of the glass substrate 41, a sensor line SNL is formed. In addition, on the sensor line SNL, a protection layer 45 is formed. The sensor line SNL configures a part of the touch sensor and corresponds to the detection electrode E2 shown in FIGS. 1A to 1D and 2. The sensor line SNL is formed from a transparent electrode material such as ITO, IZO, or an organic conductive film. In addition, in the glass substrate 41, the contact detecting unit 8 that performs a touch detecting operation may be formed.

The liquid crystal layer 6 as a "display functional layer" modulates light passing through it in the thickness direction (a direction in which electrodes face each other) in accordance with the state of an applied electric field. As the material of the liquid crystal layer 6, liquid crystal materials of various modes such as a TN (twisted nematic) mode, a VA (Vertical Alignment) mode, and an ECB (Electrically Controlled Birefringence) mode.

In addition, between the liquid crystal layer 6 and the driving substrate 2 and between the liquid crystal layer 6 and the opposing substrate 4, alignment films are disposed. In addition, on the surface of the driving substrate 2 (that is, the rear surface side) opposite to the display surface and the display surface side of the opposing substrate 4, polarizing plates are disposed. Such optical functional layers are not shown in FIG. 3.

In addition, n sensor lines SNL1 to SNLn correspond to a "plurality of detection electrodes" according to an embodiment. The n sensor lines SNL1 to SNLn, as shown in FIG. 1A are formed from a plurality of wires elongated in the direction y. Hereinafter, arbitrary one of the sensor lines SNL1 to SNLn is denoted by a sensor line The driving electrode 43 shown in FIG. 1D corresponds to each of km driving electrodes shown in FIG. 1A.

Each driving electrode is formed in a band shape that is elongated in the direction x, and km driving electrodes are disposed at a same pitch in the direction y. Each of a driving electrode group DEj (j=1, 2, 3, . . . , m), which is simultaneously driven, is configured by k driving electrodes 43 among these. Each driving electrode 43 is disposed in a direction different from that of n sensor lines SNL1 to SNLn. In this example, the driving electrode DEj and the sensor line SNLi are disposed so as to be perpendicular to each other.

The pitch of the divided dispositions of driving electrodes 43-1 to 43-km that are divided into (k×m) parts is set to a value that is (natural number) times the (sub) pixel pitch or the disposition pitch of the pixel electrodes. Here, the pitch of the divided dispositions of the driving electrodes is assumed to be the same as the disposition pitch of the pixel electrodes.

The reason for performing AC driving in units of k driving electrodes DE is so as to set the unit of the AC driving to be larger than one pixel line and increase the electrostatic capacitance of the touch sensor for increasing the detection sensitivity. In addition, invisibility of shift can be achieved by shifting the driving electrodes DE by (natural number) times the pixel pitch unit.

The materials of the TFT substrate 21 and the glass substrate 41 shown in FIG. 1B are not particularly limited. However, it is necessary that each (SLi) of the n sensor lines SNL1 to SNLn and each (DEj) of the m driving electrodes DE1 to DEm are capacitively coupled. Accordingly, the thickness and the material of the glass substrate 41 are regulated in the viewpoint of allowing the capacitive coupling to have a predetermined force.

As shown in FIG. 1A, a driving control unit 9 is disposed so as to be connected to one end of each of the m driving electrodes DE1 to DEm. In addition, a contact detecting unit 8 is disposed to one end of each of the n sensor lines SNL1 to SNLn.

In addition, the contact detecting unit 8 may be disposed on the outside of the liquid crystal display device 1. However, in this example, the contact detecting unit 8 is built in the liquid crystal display device 1.

The driving control unit 9 has an AC signal source AS for each driving electrode. The driving control unit 9 is a circuit that changes an activated AC signal source AS in a direction (scanning direction) denoted by an arrow represented within the block of the driving control unit 9 shown in FIG. 1A. Alternatively, the driving control unit 9 may be a circuit that has one AC signal source AS and switches a connection between the one AC signal source AS and one of the m driving electrodes in the scanning direction.

The driving control unit 9 is a circuit that performs detection scanning driving.

Here, the "detection scanning driving" is an operation of performing an operation of applying a detection driving voltage (for example, an AC voltage) and a shift operation of shifting between application targets in one direction (a first direction; here the direction y). A detection driving voltage (AC pulse signal) is applied, for example, to the driving electrode 43 (the driving electrode 43 may be one; however, here, k driving electrodes 43 that are adjacent to one another) to which a fixed common electric potential Vcom is applied. The driving electrodes other than the driving electrodes to which the detection driving voltage is applied are maintained to a fixed common electrode potential Vcom.

However, the applying of the detection driving voltage (AC pulse signal) for touch detection scanning is controlled not to be overlapped with a pixel line for display scanning.

In other words, in the pixel line of the display scanning, the TFT 23 is turned on in accordance with activation of the gate line GL shown in FIG. 2, and a pixel signal of the source line SL is written into the pixel electrode 22. At that time, it is necessary to maintain the electric potential of the driving electrode 43 at the fixed common electric potential Vcom, and thus, it is difficult to apply a detection driving voltage used for the touch detection scanning to the driving electrode 43.

The detection driving voltage for the touch detection scanning is applied to the driving electrode 43 so as not to be overlapped with the display scanning At this time, the detection driving voltage is applied to a bundle of the driving electrodes 43 that is formed in units of the driving electrodes DE. In addition, a shift operation may be performed, for example, in units of one or more pitches of the driving electrodes 43 that is smaller than the width (it approximately corresponds to the pitch of the k driving electrodes 43) of the driving electrode DE. This is for implementing invisibility, so that it becomes difficult to visually recognize shifting between the driving electrodes DE. The application of the detection driving voltage and the shift operation thereof are performed by the driving control unit 9, for example, under control of the control unit not shown in the figure in accordance with a predetermined algorithm.

Since each of the n sensor lines SNL1 to SNLn is capacitively coupled with the km driving electrodes 43, the pulse of the detection driving voltage that is applied to the driving electrode 43 is delivered through the electrostatic capacitance. Accordingly, a change in the electric potential occurs in each sensor, and the crest value changes (commonly decreases) as a detection target object (a person's fingertip or the like) approaches the outside thereof. The detection circuit DET of the contact detecting unit 8 detects placement of the detection target object when the change in the electric potential becomes a predetermined magnitude.

In addition, FIGS. 1A and 1B are diagrams for separately illustrating electrode patterns. However, actually, as shown in FIG. 1C, the driving electrodes 43-1 to 43-km and the sensor lines SNLi are disposed in an overlapping manner.

Under such a configuration, the contact detecting unit 8 can detect the position for the row direction based on the detection circuit DET in which a voltage change occurs and can acquire the position for the column direction based on the timing at the time of detection. In other words, it is assumed that scanning of the driving control unit 9 for the detection driving voltage and the operation of the contact detecting unit 8 are synchronized, for example, with a clock signal having a predetermined cycle. By performing such a synchronization operation, the driving electrode that is driven by the driving control unit 9 when the voltage change is acquired by the contact detecting unit 8 can be identified. Accordingly, the center of the contact position of the finger can be detected. Such a detection operation is controlled by an overall control circuit of a computer base, not shown in the figure, such as a CPU, a microcomputer, or a control circuit for touch detection that controls the overall operation of the liquid crystal display device 1.

The driving control unit 9 is formed on the driving substrate 2 side in FIG. 1D. However, the contact detecting unit 8 may be disposed on the driving substrate 2 side, the opposing substrate 4, or the outside of the liquid crystal display device 1.

Since many TFTs are integrated, it is desirable to form the contact detecting unit 8 in the driving substrate 2 in order to decrease the number of manufacturing processes. However, there are cases where the sensor lines SNL formed from a transparent electrode material are placed on the opposing substrate 4 side and the wiring resistance increases. In such a case, in order to avoid the inconvenience of high wiring resistance, it is preferable to form the contact detecting unit 8 on the opposing substrate 4 side. However, there is a disadvantage of high costs in a case where a TFT forming process is used in the opposing substrate 4 only for the contact detecting unit 8. In consideration of all the advantages and all the disadvantages described above, the formation position of the contact detecting unit 8 may be determined.

Liquid Crystal Driving in Horizontal Electric Field Mode

Figure 3:
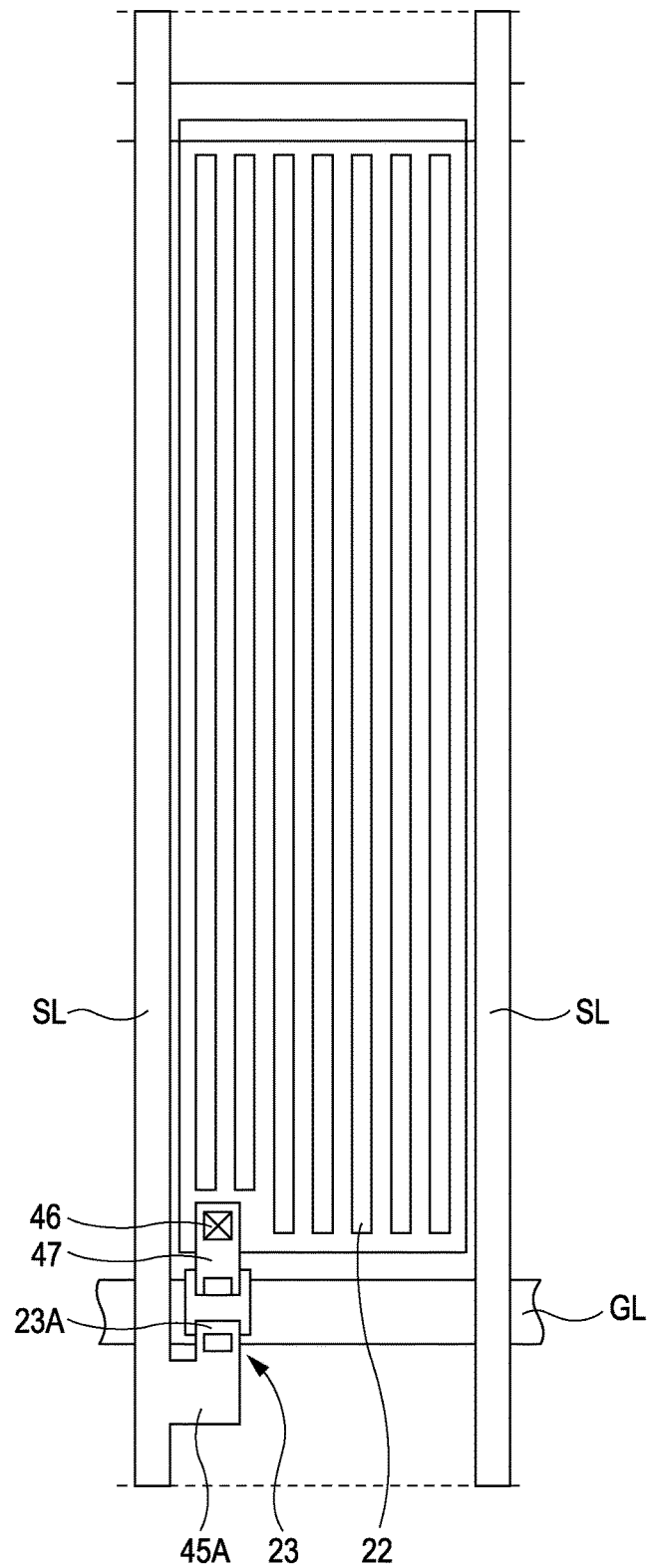
FIG. 3 is a plan view representing a top view of a TFT substrate of a pixel of an FFS liquid crystal.

FIG. 3 shows a top view of a TFT substrate 21 of a pixel PIX of an FFS (Field Fringe Switching) mode liquid crystal.

A pixel electrode 22 is formed in a transparent electrode layer TE and has a plurality of slits. As the material of the transparent electrode, an ITO, an IZO, an organic conductive film, or the like can be used. On the lower side of the pixel electrode 22, a driving electrode 43 is formed so as to face the pixel electrode 22 (FIG. 1D). The driving electrode 43 is formed in the transparent electrode layer TE that is common to all the pixels.

The pixel electrode 22 is connected to an internal wire 47, which is formed from aluminum AL or the like, of the lower layer through a contact 46. The internal wire 47 is connected to one of the source and the drain that are formed in a thin film semiconductor layer 48 of a TFT 23 that is formed from poly silicon (PS). To the other of the source and the drain of the thin film semiconductor layer 48, a source line SL that is formed from aluminum (AL) is connected. A gate line GL that is intersects a lower layer of the thin film semiconductor layer 48 is formed from a gate metal (GM) such as molybdenum (Mo) and is disposed in a direction perpendicular to the source line SL.

In addition, on the upper side (a portion not shown in the figure) of the TFT substrate 21 having various patterns shown in FIG. 3, the opposing substrate 4 shown in FIG. 1D is overlapped, and a liquid crystal layer 6 is formed between the two layers. A first polarizing plate and a second polarizing plate are disposed on the two substrates.

Configuration of Display Driver

Figure 4:
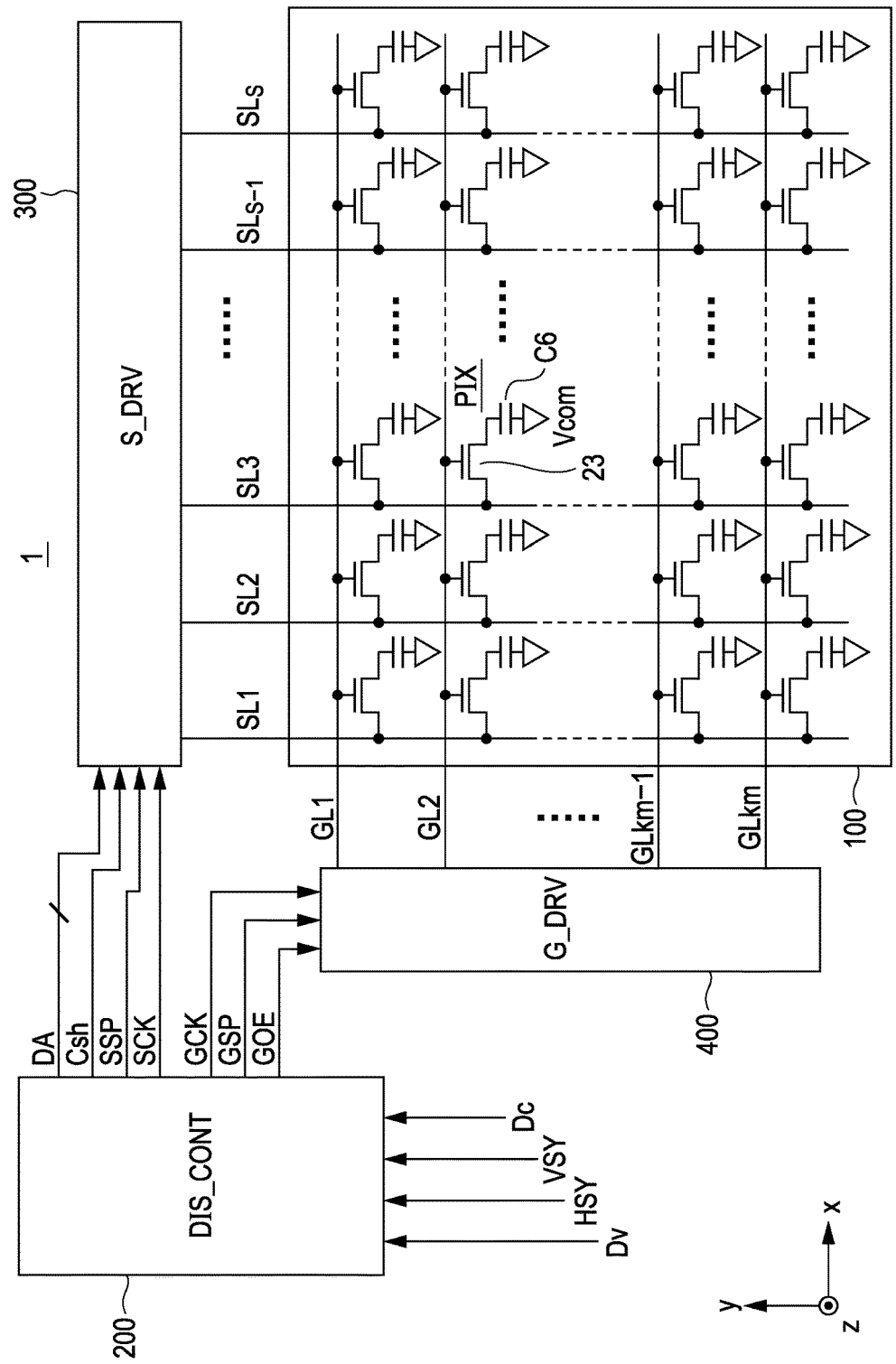
FIG. 4 is a block diagram showing a configuration example of a driver that can perform dot inversion for inverting the polarity of a pixel signal for each pixel.

FIG. 4 is a block diagram showing a configuration example of a driver that can perform dot inversion for inverting the polarity of a pixel signal for each pixel.

The liquid crystal display device 1 shown in FIG. 4 has a display unit 100 in which the pixels PIX shown in FIGS. 2 and 3 are arranged in a matrix pattern.

From the display unit 100, s source lines SL1 to SLs are drawn out from one side of the direction y, and km gate lines GL1 to GLkm are drawn out from one side of the direction x.

To the s source lines SL1 to SLs, a source driver (S_DRV) 300 as a pixel signal driving circuit is connected. In addition, to the km gate lines GL1 to GLkm, a gate driver (G_DRV) 400 is connected.

In addition, to the source driver 300 and the gate driver 400, a display control circuit (DIS_CONT) 200 that controls the drivers is connected.

For example, a "pixel signal control unit" according to an embodiment is configured by the source driver 300, the gate driver 400, and the display control circuit 200.

To the display control circuit 200, a digital video signal Dv that represents an image to be displayed and a control signal Dc that is used for controlling a display operation are input from an external signal source. In addition, to the display control circuit 200, a horizontal synchronization signal HSY and a vertical synchronization signal VSY corresponding to the digital video signal Dv are externally supplied.

The display control circuit 200 generates four signals DA, Cch, SSP, and SCK of a source driving system and three signals GCK, GSP, and GOE of a gate driving system as signals used for displaying an image represented by the digital video signal Dv in the display unit 100. The display control circuit 200 generates such signals based on the input signals Dv, Dc, HSY, and VSY.

Here, the digital pixel signal DA is a signal that is generated by the display control circuit 200 based on the video signal Dv and includes display grayscale information. The display control circuit 200 generates a digital pixel signal DA by performing timing adjustment of the video signal Dv in the internal memory or the like as is necessary and outputs the digital pixel signal DA to the source driver 300.

In addition, the display control circuit 200 generates a data start pulse signal SSP, a data clock signal SCK, and a short circuit control signal Csh and outputs the generated signals to the source driver 300.

The data clock signal SCK is a signal formed from pulses corresponding to each pixel of an image represented by the digital pixel signal DA and is used as a shift operation clock of the source driver 300.

The data clock signal SCK is a signal that is in the high level (level H) only for a predetermined period for each one horizontal scanning period (1 H) based on the horizontal synchronization signal HSY and is a signal that controls the start and the end of a 1 H shift operation of the source driver 300. By performing this operation, the digital pixel signal DA is distributed to a predetermined number (for example, 4, 6, 12, or the like) of output selection paths. For example, in the case of six-selector mode, a predetermined number (s/6) of pixel signals are simultaneously output for each six source lines SL, and this operation is repeated a total of six times, whereby pixel signals of 1 H period are discharged.

The short circuit control signal Csh is a signal that is used for dot inversion. The short circuit control signal Csh is generated by the display control circuit 200 based on the horizontal synchronization signal HSY and the control signal Dc and is output to the source driver 300.

The display control circuit 200 generates the gate start pulse signal GSP, the gate clock signal GCK, and the gate driver output enable signal GOE and outputs the generated signals to the gate driver 400.

The gate clock signal GCK is generated based on the horizontal synchronization signal HSY and is used as a scanning clock for shifting the gate pulse of the gate driver 400.

The gate start pulse signal GSP is a signal that is in the level H for a predetermined period of one frame period (one vertical scanning period) based on the vertical synchronization signal VSY.

The gate driver output enable signal GOE is generated based on the horizontal synchronization signal HSY and the control signal Dc. The gate driver 400 controls the start and the end of a one frame (1F) display operation based on the gate driver output enable signal GOE and the gate start pulse signal GSP.

The source driver 300 sequentially generates data signals as analog voltages corresponding to pixel values for each horizontal scanning line of an image represented by the digital pixel signal DA for each one horizontal scanning period based on the digital pixel signal DA, the start pulse signal SSP, and the clock signal SCK. Then, the source driver outputs the generated data signals to the source lines SL1 to SLs, for example, in the six-selector mode.

In addition, the source driver 300 has a function such as dot inversion for inverting the polarity of a pixel signal, for example, with respect to the common electric potential Vcom used as the center. Here, the "dot inversion" indicates an operation of inverting a voltage applied to the liquid crystal layer 6 for each one gate line in the direction x and for each one source line in the direction y within one frame period by inverting the polarity of the pixel signal. Alternatively, a case where the polarity of the pixel signal for a same pixel is inverted for a different frame period (screen display period) may be included so as to be referred to as dot inversion driving. The source driver 300 may be configured to invert the pixel signal only in the direction x instead of performing dot inversion between pixels adjacent in both the directions y and x.

In addition, the center electric potential that becomes the reference of the polarity inversion of the pixel voltage is, strictly speaking, a DC level (an electric potential corresponding to a DC component) of a pixel signal. The DC level does not coincide with the common electric potential Vcom. In other words, the center electric potential of the polarity inversion is different from the DC level of the common electric potential Vcom by a level shift due to parasitic capacitance between the gate and the drain of the TFT of each pixel. However, in a case where the level shift due to the parasitic capacitance is sufficiently small relative to the optical threshold voltage of the liquid crystal, the DC level of the pixel signal (data signal) can be regarded to be the same as the DC level of the common electric potential Vcom. Accordingly, commonly, the polarity of the data signal, that is, the polarity of the voltage applied to the source line may be regarded as being inverted with the electric potential of the common electric potential Vcom used as the reference.

In the sense of averaging local DC biases of the liquid crystal, it is preferable that the polarity of the pixel signal is inverted for each pixel for 1 H period.

In addition, in the source driver 300, in order to decrease power consumption, adjacent source lines are short circuited in accordance with the short circuit control signal Csh when the polarity of the data signal is inverted.

The gate driver 400 sequentially writes data signals into the capacitors of the pixel electrodes 22 based on the start pulse signal GSP, the clock signal GCK, and the gate driver output enable signal GOE. At this time, the gate driver 400 sequentially selects the gate lines GL1 to GLkm for each almost 1 H period during each period (each vertical scanning period) of the digital pixel signal DA.

Inconvenience for Case (Comparative Example) of 1 H Vcom Inversion

In this embodiment, the inversion of the common electric potential Vcom for each 1 H period is not basically performed, and the reason is as follows.

Figure 5:
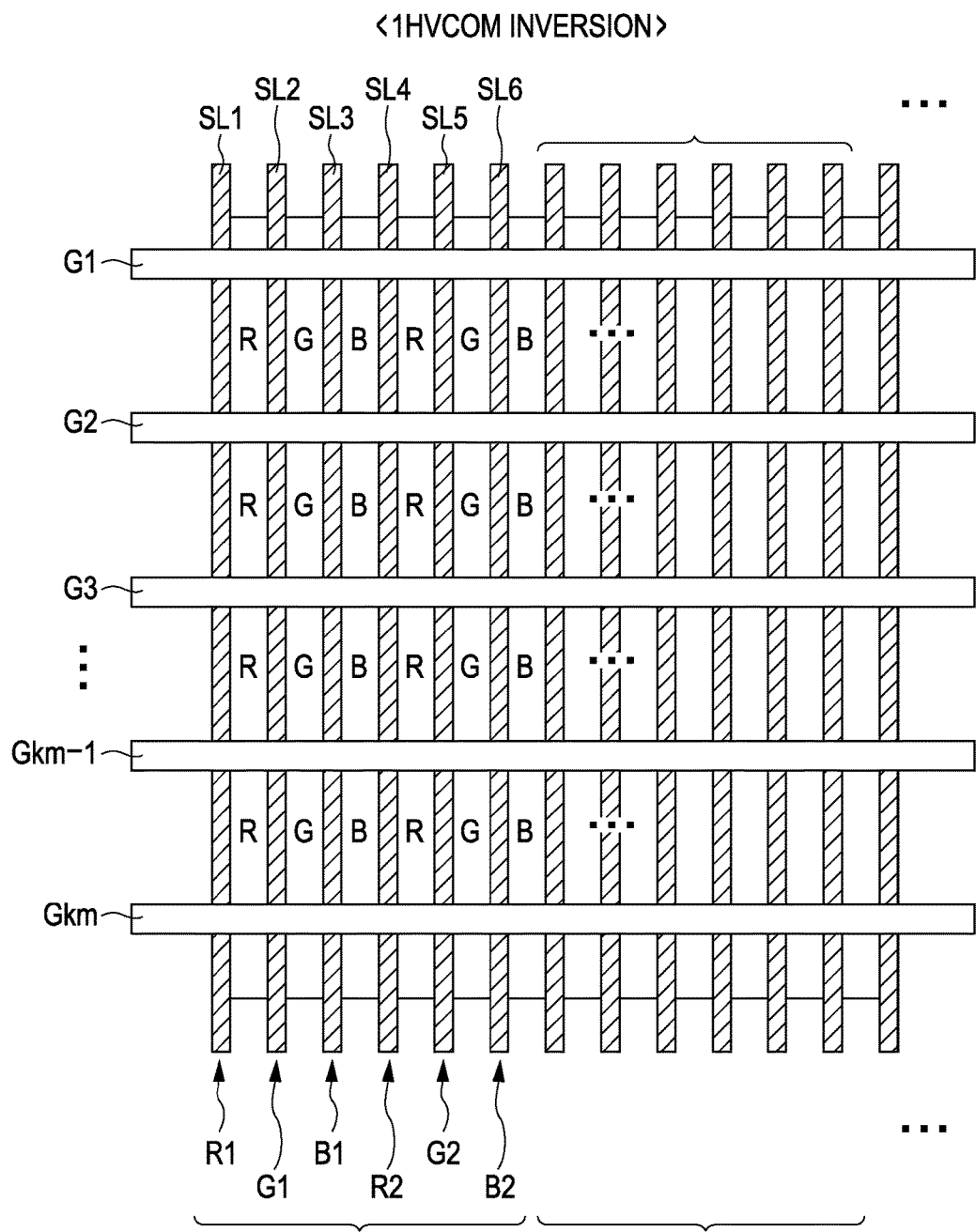
FIG. 5 is a plan view showing the configuration for performing matrix driving of a pixel arrangement that is colored for each pixel by using a source line and a gate line.

FIG. 5 is a plan view showing the configuration for performing matrix driving of the pixel arrangement that is colored for each pixel by using the source line SL and the gate line GL.

In the example of coloring shown in FIG. 5, one color of red (R), green (G), and blue (B) is arranged for each pixel column. For example, an R1 signal and an R2 signal that are red (R) pixel signals are given to the source lines SL1 and SL4 at different timings. In addition, a G1 signal and a G2 signal that are green (G) pixel signals are given to the source lines SL2 and SL5 at different timings. A B1 signal and a B2 signal that are blue (B) pixel signals are given to the source lines SL3 and SL6 at different timings.

Described in more detail, the R1 signal is simultaneously given to source lines SL of the first, the seventh, and so on including the source line SL1 with six source lines being used as one set. Similarly, the R2 signal is simultaneously given to source lines of the 4th, the 10th, and so on including the source line SL2.

In addition, the G1 signal is simultaneously given to source lines of the second, the eighth, and so on including the source line SL2, and the G2 signal is simultaneously given to source lines of the 5th, the 11th, and so on including the source line SL5.

Similarly, the B1 signal is simultaneously given to source lines of the third, the ninth, and so on including the source line SL3, and the B2 signal is simultaneously given to source lines of the 6th, the 12th, and so on including the source line SL6.

The pixel signals (color signals) sequentially given within a set with six source lines SL being used as the set are applied to pixel rows corresponding to any of the activated gate lines GL1 to GLkm. This mode is referred to as a six-selector mode.

Figure 6A:
FIGS. 6A and 6B are diagrams illustrating the common electric potential and the polarity of a pixel signal in a six-selector mode.
Figure 6B:
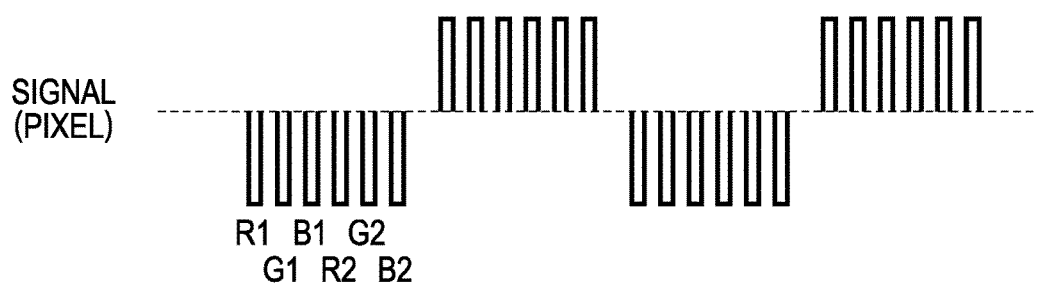

FIGS. 6A and 6B are diagrams illustrating the common electric potential Vcom and the polarity of the pixel signal in the six-selector mode.

In the comparative example in which the 1 H Vcom inversion driving is performed, the common electric potential Vcom that is the electric potential of the opposing electrode (the driving electrode 43) is driven so as to be inverted, for example, with respect to 0 V as the center for each one horizontal period (1 H).

When the common electric potential Vcom has the positive polarity, the pixel signal is given as a negative pulse. On the other hand, when the common electric potential Vcom has the negative polarity, the pixel signal is given as a positive pulse. When a same voltage value is given even in the case of the opposite direction of the electric field, a display of the same grayscale is performed in the liquid crystal layer 6. In FIGS. 6A and 6B, six pulses for each 1 H period are denoted by the reference signs of the color signals shown in FIG. 5.

Figure 7A:
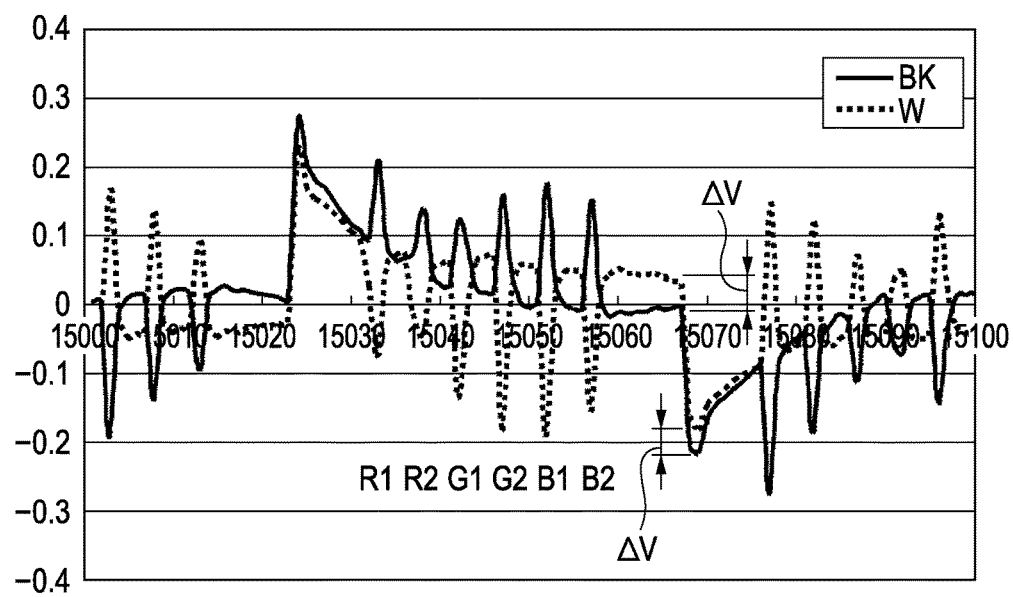
FIGS. 7A and 7B are diagrams showing the polarities of pixel signal pulses corresponding to a measurement result of a change in the electric potential of a detection electrode (sensor line) according to a comparative example in which 1 H Vcom inversion driving is performed.
Figure 7B:
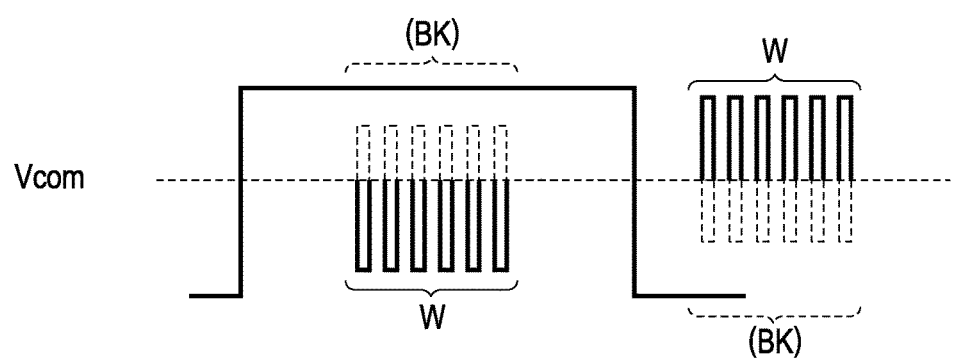
Figures 8A, 8B:
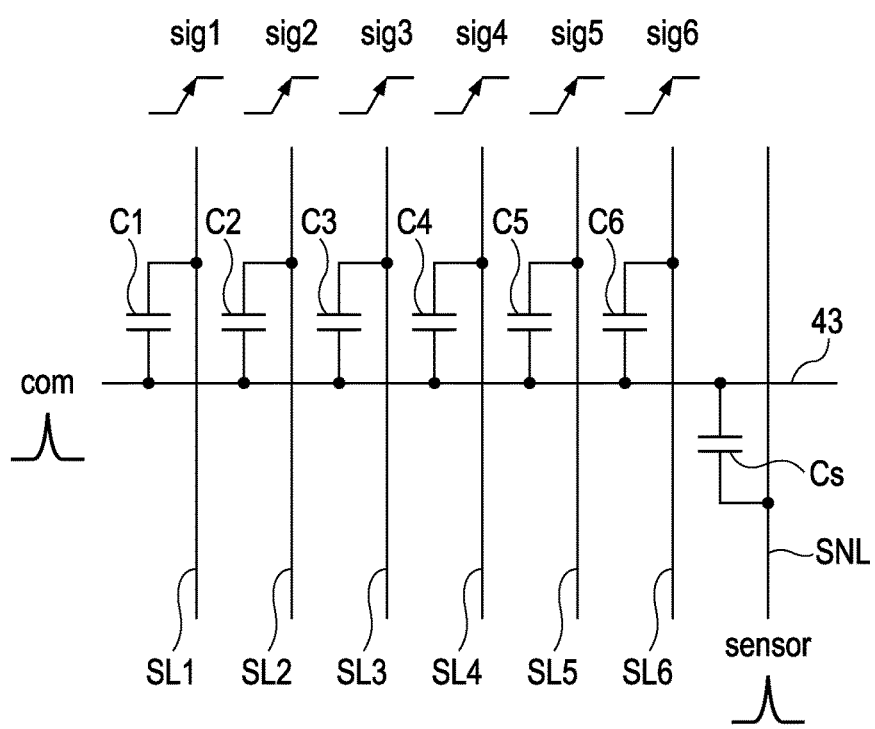
FIGS. 8A and 8B are diagrams representing the polarity of error and the path of a change in the electric potential of a sensor line.

FIG. 7B is a diagram showing a difference in the polarities of the pixel signal pulses in a black display (BK) and a white display (W) of the comparative example, in which 1 H Vcom inversion driving is performed, shown in FIGS. 6A and 6B. FIG. 7A is a graph acquired by actually measuring changes in the electric potential of the sensor line SNL with the horizontal axis thereof representing time. In addition, FIGS. 8A and 8B are diagrams illustrating generation of noises of electric potential variations in the sensor line.

FIGS. 6A and 6B described above illustrate a case where a pixel that is brighter than a specific average has a pulse repeated during a short period of the 4 H period. Thus, an example in which display of approximately the same grayscale is performed near the white display (W) is shown. On the other hand, as shown in FIG. 7B, for the electrostatic capacitance in the black display (BK), the pixel signal (signal of the luminance of color) is a positive pulse acquired by inverting the polarity of the pixel signal pulse.

In FIG. 7A, a solid line corresponds to the black display (BK), and a broken line corresponds to the white display (W). In this comparative example, simultaneously when the driving electrode 43 applies the common electric potential Vcom for display, the common electric potential Vcom that is driven in the 1 H inversion mode is used as an AC pulse of the detection driving voltage.

The reason for the overall attenuation of the detected electric potential is that the sensor line SNL has wiring resistance, and the detection circuit has resistance. It can be understood that an electric potential difference $\Delta V$ is generated due to a difference in grayscales at the reaching point of the attenuation at the end of the 1 H period, that is, prior to change of the common electric potential Vcom from the positive polarity to the negative polarity. This electric potential difference is successive to the next common electric potential Vcom of the negative polarity as an initial electric potential difference. Detection of an object is to detect a change (decrease) from a high level before the crest value of output of the sensor line attenuates after the change in the polarity in accordance with approach of a detection target objet. Accordingly, the electric potential difference $\Delta V$ becomes an error component of object detection.

As shown in FIG. 7B, during the period of the next negative polarity Vcom, the pulse polarities of white display and black display are inverted (see FIGS. 6A and 6B). In addition, for the same pixel, the pulse polarity is inverted even during the next 1 H period. When the white display is defined as generation of a "+" error component as shown in FIG. 7A, one pixel line has error of "+" during the first 1 H.

On the other hand, the one pixel line has error of "−" during the next 1 H. Then, such operations are repeated.

FIG. 8A is a schematic diagram representing the polarity of the error.

FIG. 8B shows a path of the change in the electric potential of the sensor line.

As described above, the driving electrode 43 (see FIGS. 1A to 1D) is disposed so as to intersect with the source lines SL1 to SLkm. Accordingly, the driving electrode 43 and the source lines are capacitively coupled with each other more or less. The force of the capacitive coupling increases as the thickness of the display device is decreased. The coupled capacitance C1 to C6 shown in FIG. 8A represents the electrically coupled forces of the source lines SL1 to SL6 with the driving electrode (opposing electrode) 43.

On the other hand, the driving electrode 43 is electrically coupled with the sensor line SNL, which is disposed perpendicular thereto, through electrostatic capacitance Cs. Accordingly, when the electric potentials of the source lines SL1 to SLkm are changed in accordance with application of a pixel signal pulse, the changed electric potentials are transferred to the sensor line SNL from the driving electrode 43 through the electrostatic capacitance.

Control of Inversion of Pixel Signal for Preventing Inconvenience of Comparative Example In order to prevent the above-described inconveniences, in this embodiment, the following countermeasures are taken.

Figures 9A, 9B:
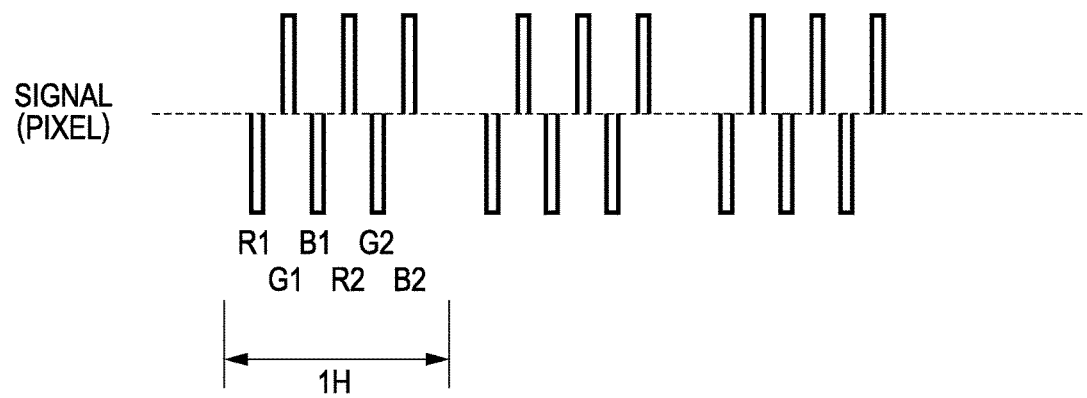
FIGS. 9A and 9B are diagrams representing a common electric potential and a pixel signal according to the first embodiment.

FIGS. 9A and 9B represent a common electric potential Vcom and a pixel signal according to this embodiment.

In this embodiment, during the 1 H display period, the common electric potential Vcom is maintained at a constant electric potential. As a case satisfying this condition, there is a case where the common electric potential Vcom is maintained at a constant electric potential even when the 1 H display period transits to the next 1 H display period unless detection driving is performed. In addition, a case where inversion driving is performed for each 1 H also satisfies the condition. In other words, the period during which the common electric potential Vcom is maintained at a constant electric potential is "at least during the 1 H period", and the common electric potential is arbitrary during other periods.

In addition, regarding the pulses of pixel signals, during the 1 H display period, the polarities of pulses of one or more pixel signals are inverted with respect to those of pulses of other pixel signals. It is preferable that the number of pulses of which the polarities are inverted is the same as that of pulses of which the polarities are not inverted, within the 1 H period. When the polarity of at least one pulse is inverted, the noise component of the output of the sensor detection is decreased as much. However, when the number of the pulses of which the polarities are inverted is the same as that of the pulses of which the polarities are not inverted, the noise component is further decreased or the noise component is scarcely generated.

Such control of the polarities of pulses is performed by controlling an internal inversion driving unit in accordance with a short circuit control signal Csh that is output from the display control unit 200 or the like by using the source driver 300 shown in FIG. 4.

Figures 10A, 10B:
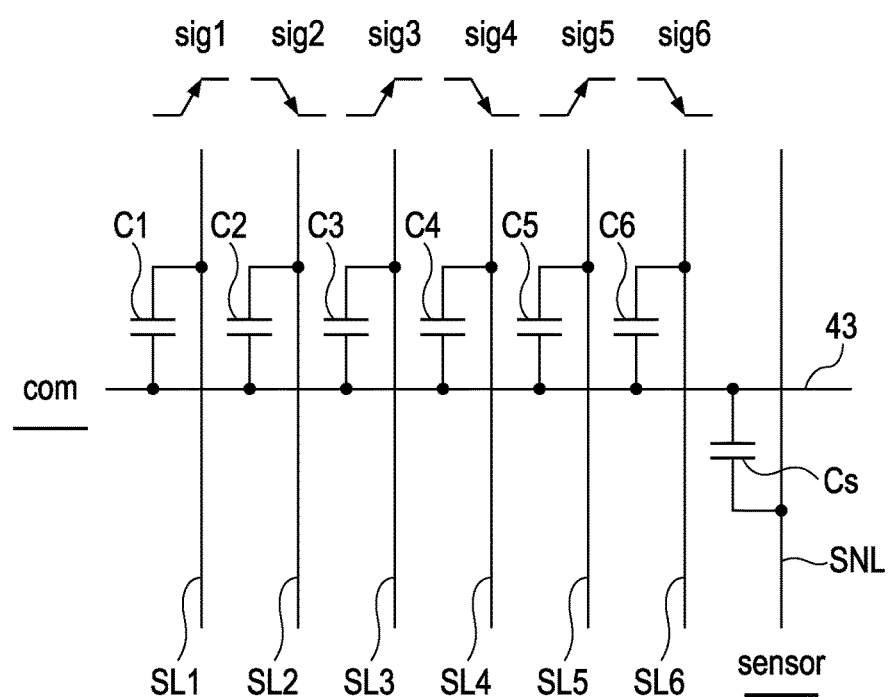
FIGS. 10A and 10B are diagrams illustrating the effect of the first embodiment.

FIGS. 10A and 10B are diagrams illustrating the effect of a case where the polarities of the pixel signals are alternately changed in the horizontal direction, similarly to the case of FIG. 9B.

As can be known from the example shown in FIGS. 7A and 7B, since the white display (W) of the negative polarity is a factor causing error of "+", the polarity of the pixel signal and the opposite polarity become potential error factors. Accordingly, in the control of the pulse polarities shown in FIG. 9B, the polarities of the potential error factors exist in the order of "+", "−", "+", . . . for the first pixel line.

In the configuration shown in FIGS. 1A to 1D, the driving electrodes 43 are thinly separated for each pixel line, and intersect with any source line among the s source lines SL1 to SLs in the same manner. Accordingly, as shown in FIGS. 10A and 10B, when the error component of "+" and the error component of "−" are balanced in a pixel line arranged in the horizontal direction, the changes in the electric potentials through the coupling capacitance C1 to C6 are almost canceled for the driving electrode 43 located in any position. Therefore, the change in the electric potential of the driving electrode 43 is sufficiently suppressed. As a result, the change in the electric potential due to the pixel signal of the sensor line SNL is prevented or sufficiently suppressed.

2. Second Embodiment

In the above-described first embodiment, as a premise for not generating a noise component, there is a case where pulses having the positive polarity and pulses having the negative polarity are balanced in the crest values thereof. As such a case, there is a case where a specific color is displayed in the entire area of a horizontal pixel row or the like. However, it is predicted that the effect of noise generation changes depending on the content of display.

This second embodiment provides a configuration capable of acquiring a high effect of noise prevention regardless of the content of display as an example.

Figures 11A, 11B:
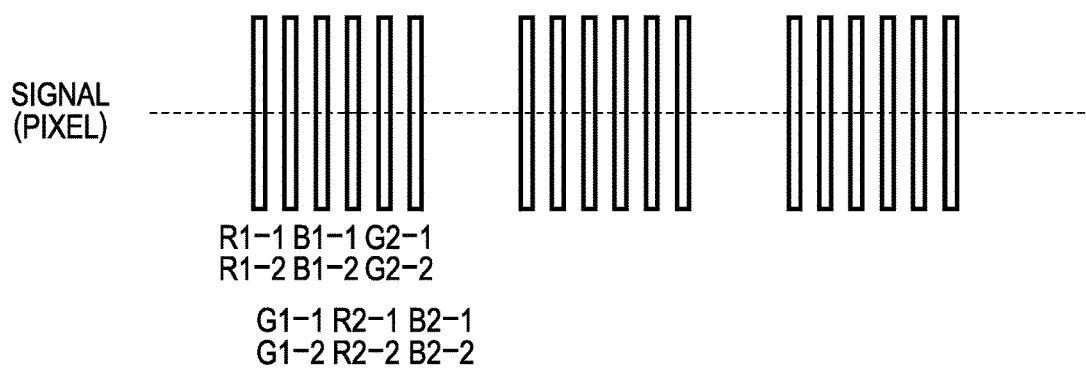
FIGS. 11A and 11B are diagrams showing the relationship between a common electric potential and a pixel signal according to the second embodiment.

FIGS. 11A and 11B illustrate a common electric potential Vcom and a pixel signal according to this embodiment.

In this embodiment, similarly to the first embodiment, the common electric potential Vcom is set to a fixed electric potential during display control. In addition, a preferred condition that the number of pulses of which the polarities are inverted is the same as that of pulses of which the polarities are not inverted within 1 H period is satisfied.

FIG. 11B representing this embodiment is different from FIG. 9A in that two pulses of pixel signals are simultaneously applied to a same pixel line.

At this time, in a case where one pixel of a pixel line has an ordinary one pixel configuration shown in FIGS. 6A and 6B, pixel signals having different polarities are offset from each other.

Thus, according to this embodiment, it is necessary that a pixel configuration in which pixel signals having different polarities are not offset from each other is used. This can be implemented by respectively arranging a pixel electrode 22 and a TFT 23 in two areas within one pixel by using technology so-called "pixel division". The pixel division is based on a concept that a pixel is defined as a minimum unit displaying a same grayscale and a same color. In a case such a concept is not employed, the above-described technology can be described as "technology (hereinafter, referred to as pixel-pair driving") of simultaneously driving two pixels of a same color with a same grayscale.

Figure 12:
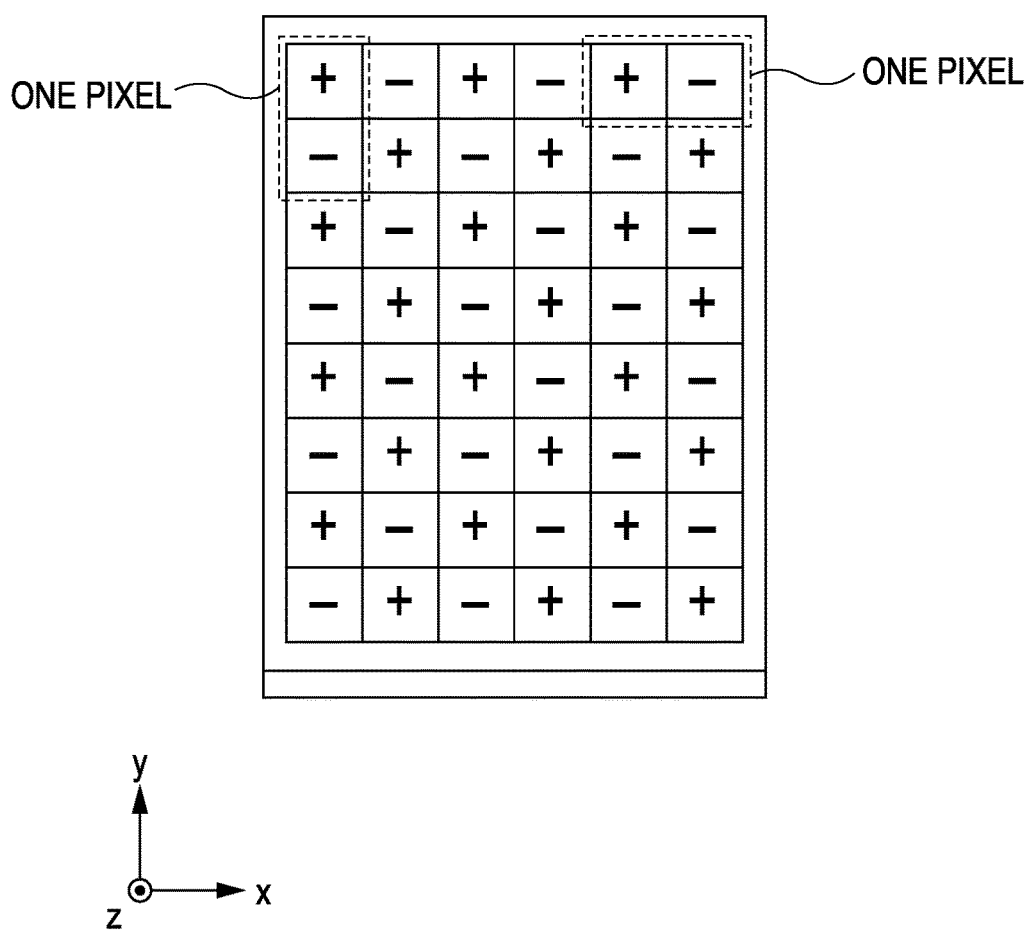
FIG. 12 is a diagram illustrating a method of defining two areas (or two pixels forming a pixel pair) within one pixel.

The two areas (or two pixels forming a pixel pair), as shown in FIG. 12, may be configured as areas (or pixels) adjacent in the row direction or areas (or pixels) adjacent in the column direction. These adjacent areas (or adjacent pixels) are colored by the color filters 42 of a same color.

For the case of the adjacent areas (or pixels) for the row direction, two different source lines SL that are adjacent to each other are simultaneously driven as a pair with pixel signals of a same grayscale. On the other hand, for the case of the adjacent areas (or pixels) for the column direction, two adjacent gate lines GL are almost simultaneously driven, so that a pixel signal of one source line is simultaneously written into two areas (two pixels).

Here, when described as "simultaneously", it means that control is performed in a substantially same period, and a slight time different is allowed.

According to the second embodiment, generation of error is prevented. Accordingly, a high effect of noise suppression can be acquired regardless of the content of display.

In addition, as methods of controlling the pixel signal control unit shown in FIG. 4, that is, the display control circuit 200, the source driver 300, and the gate driver 400, there are two methods described below.

In a first method, in a case where two areas (or two pixels) for the column direction (direction y) shown in FIG. 12 are driven as one pixel, it is necessary that pixel signals having different polarities are loaded into two areas (or two pixels). In such a case, a pulse having the positive polarity and a pulse having the negative polarity are alternately applied in the pixel signal, and the sampling timing of the pulse is controlled to be the timing when the TFT 23 is turned on by the display control circuit 200 and the gate driver 400.

In such a case, the variations of the electric potential of the pixel signal are averaged, whereby generation of noises is suppressed by the generation source.

In a second method, in a case where the two areas (or two pixels) for the row direction (direction x) shown in FIG. 12 are driven as one pixel, the sampling timing of the pixel signal is not significantly important. On the other hand, it is important that pixel signal pulses having different polarities are discharged to different pixel signal lines at the same time. In other words, it is important that the discharge timings of particularly the display control circuit 200 and the source driver 300 of the pixel signal control unit for the pixel signal lines are uniform (at the same time) in adjacent pixel signal pulses having opposite polarities. Here, "at the same time" is not for the purpose of excluding a slight time difference.

Accordingly, although it is difficult to suppress the variations of the electric potential of an individual pixel signal line, the variations of the electric potential are offset by the driving electrode 43, so that the influence thereof on the precision of the sensor detection can be excluded in advance.

3. Modified Examples

In FIGS. 9A and 9B, the R1 signal, the R2 signal, the G1 signal, the G2 signal, the B1 signal, and the B2 signal are supplied to (s/6) pixel signal lines (source lines SL) as pixel signal pulses having a same polarity. By changing the selector mode, for example, by simultaneously supplying halves of the R1 signal and the R2 signal and simultaneously supplying the remaining halves thereof, noises that are temporally overlapped in the driving electrode 43 can be offset from each other. In such a case, although the variations of the electric potential in each source line SL are not suppressed, the noises have different polarities and thus are offset from each other in the driving electrode 43. As a result, overlapping between noises in the sensor line SNL is prevented or suppressed.

In the second embodiment, it can be configured that the source driver 300 shown in FIG. 4 can switch between a pixel division mode in which the precision of sensor detection has priority and a common mode in which high-quality image display has priority by not performing pixel division.

For example, an operation screen is displayed. Then, in a case where an operation through touch detection that is performed by a finger or the like is expected, the pixel division mode may be set so as to increase the precision of sensor detection. On the other hand, in other cases where a video is reproduced or the like, the pixel division mode may be released so as to perform high-quality video display.

Figure 13:
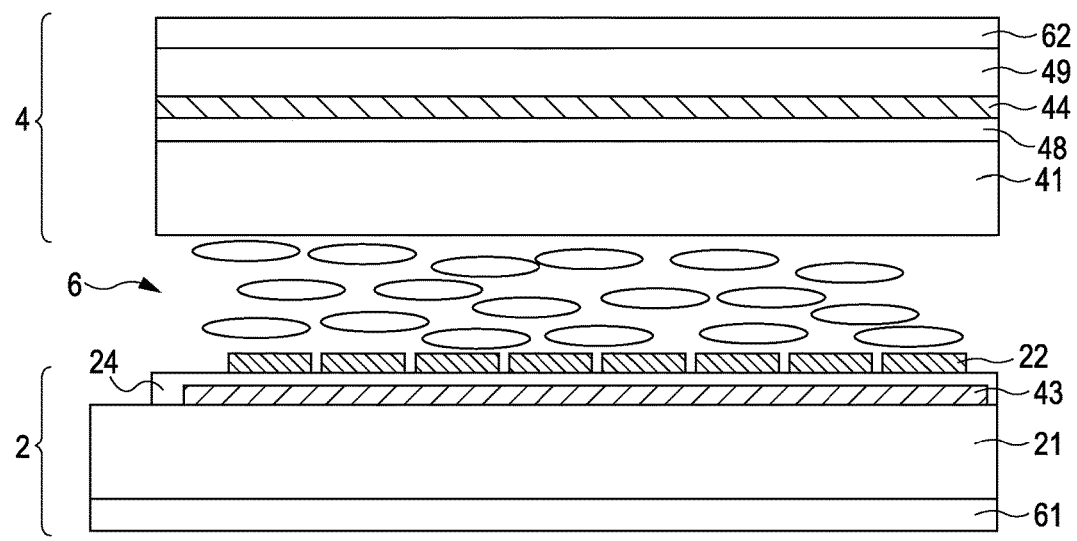
FIG. 13 is a schematic diagram of a cross-section structure showing a first modified example of the configuration of a liquid crystal display device of the horizontal electric field mode.
Figure 14:
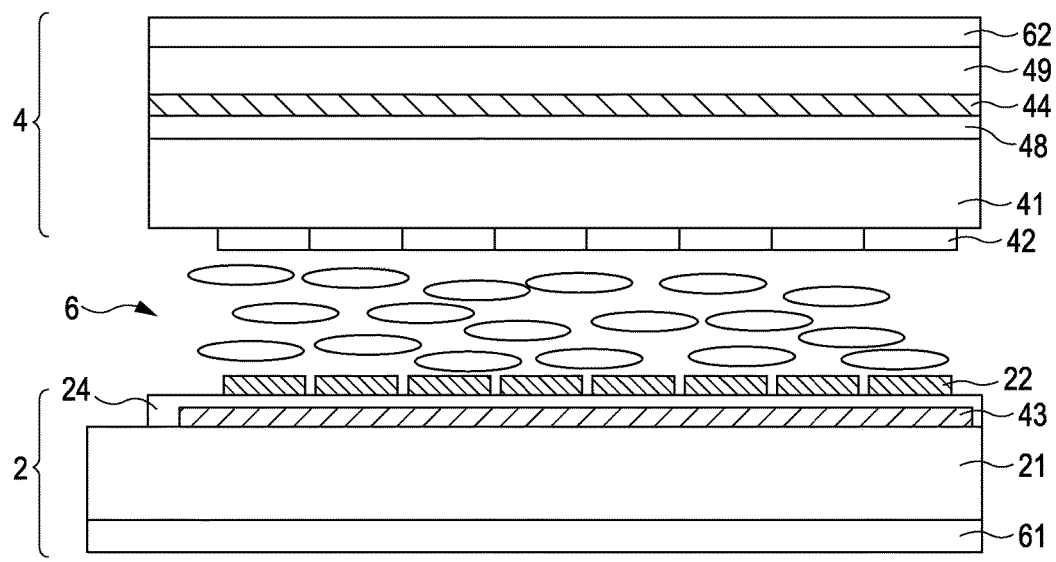
FIG. 14 is a schematic diagram of a cross-section structure showing a second modified example of the configuration of a liquid crystal display device of the horizontal electric field mode.
Figure 15:
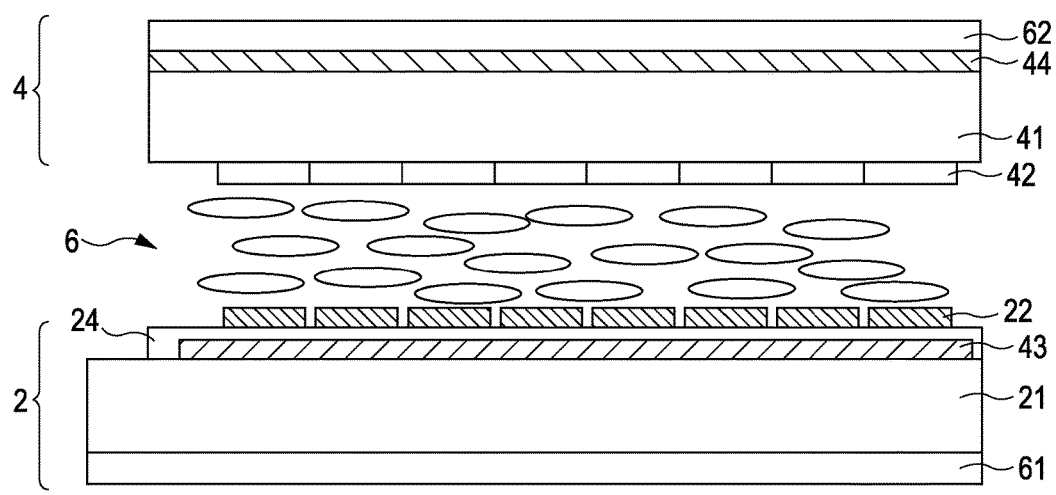
FIG. 15 is a schematic diagram of a cross-section structure showing a third modified example of the configuration of a liquid crystal display device of the horizontal electric field mode.

FIGS. 13 to 15 represent examples of the structure of the opposing substrate side 4 of a horizontal electric field mode liquid crystal display device.

As described above, in the horizontal electric field mode, a pixel electrode 22 and a driving electrode 43 are disposed on a driving substrate 2 side.

In the structure shown in FIG. 13, the driving electrode 43 is disposed on the front-side (display surface side) face of a TFT substrate 21, and the driving electrode 43 and a pixel electrode 22 are located adjacent to each other through an insulating layer 24. The driving electrode 43 is disposed in a line shape elongated in the direction of a display line (direction x), and the pixel electrodes 22 are separated for each pixel in the direction of the display line.

The TFT substrate 21 is bonded to the glass substrate 41 with the pixel electrode 22 side thereof being located adjacent to a liquid crystal layer 6. The liquid crystal layer 6 is strongly maintained by a spacer not shown in the figure.

Reference numeral "49" denotes a base member of the display surface side such as glass or a transparent film. On one face of the base member 49, the sensor line SNL is formed. The sensor line SNL maintained in the base member 49 is fixed to the anti-liquid crystal side surface of the glass substrate 41 through an adhesive layer 48.

On the other hand, to the rear surface of the TFT substrate 21, a first polarizing plate 61 is attached, and a second polarizing plate 62 having the polarization direction different from that of the first polarizing plate 61 is attached to the display surface side of the base member 49.

On the display surface side of the second polarizing plate 62, a protection layer not shown in the figure is formed.

In the structure shown in FIG. 14, a color filter 42 is formed on the liquid crystal side of the glass substrate 41 in advance. In the color filter 42, color areas that are different for each (sub) pixel are regularly disposed.

In the structure shown in FIG. 15, the laminated structure on the display surface side is different from that of FIG. 14.

In the structure shown in FIG. 14, the sensor line SNL is formed in the base member 49 in advance and is attached, for example, as a roll-shaped member. However, in FIG. 15, the sensor line SNL is formed on the display surface side of the glass substrate 41, and the second polarizing plate 62 is attached thereon.

According to the first and second embodiments and the modified examples described above, the thickness of the display device can be decreased by disposing the detection electrode used for noise detection near the display functional layer. In such a case, the noise caused by the pixel signal can be decreased. Accordingly, a touch panel-attached display device having improved detection precision can be provided.

In particular, when pixels of which the polarities are inverted are adjacently located, a display device capable of preventing generation of flicker or the like together with improving the precision of touch detection can be achieved.

In addition, by employing dot-inversion driving, a signal of which the polarity is inverted can be written in an easy manner.

In addition, by configuring a liquid crystal display device, detection driving and display driving can be controlled by an electrode (common electrode) of one layer. Accordingly, an integrated display device can be formed.

In the horizontal electric field mode, the common electrode can be formed on the TFT side. Accordingly, a driving circuit that is used for driving the common electrode as an electrode for a touch panel can be formed in an easy manner.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A display device comprising:
   a display functional layer that can change display for each pixel in accordance with an application voltage;
   a plurality of driving electrodes, disposed in a first direction so as to be separated from one another, to which a display reference electric potential maintained at a constant level is applied during a display period in which display is performed in a pixel arrangement along the first direction and to which a detection driving signal is applied when detection scanning is performed by changing the display reference electric potential to another electric potential;
   a plurality of pixel signal lines to which pixel signals used for applying the application voltage to the display functional layer in accordance with an electric potential difference from the display reference electric potential are applied;
   a plurality of detection electrodes that are disposed so as to be separated from one another in a direction other than the first direction, are coupled with the plurality of the driving electrodes as electrostatic capacitance, generate detection electric potentials in response to the detection driving signal that is applied to at least one driving electrode; and
   a pixel signal control unit that controls the plurality of pixel signals applied to the plurality of pixel signal lines so that pixel signals in one display period have at least one pulse whose polarity is inverted and that the pixel signals before being inverted and the pixel signals after being inverted have the same electric potential differences as the display reference electric potential.

2. The display device according to claim 1,
   wherein the inside of one pixel is divided into two areas, and a pixel electrode and a switching device are disposed in the areas, and
   wherein the pixel signal control unit controls polarity control and supply timings of the pixel signals and opening or closing of the switching device such that the same pixel signal is supplied from one pixel signal line to the two areas inside the same pixel with opposite polarities.

3. The display device according to claim 1,
   wherein the inside of one pixel is divided into two areas, and each of the areas is configured so as to be able to maintain different pixel signals, and
   wherein the pixel signal control unit controls polarity control of the pixel signals and discharge timings for two different pixel signal lines adjacent to each other such that the same pixel signal is supplied from the two different pixel signal lines to the two areas inside the same pixel with opposite polarities.

4. The display device according to claim 1, wherein the pixel signal control unit controls the pixel signals having opposite polarities so as to be simultaneously discharged to a plurality of pixel signal lines when an operation of supplying the pixel signal to one pixel electrode inside one pixel through a switching device is performed for a plurality of pixels in a parallel manner.

5. The display device according to claim 1, wherein the pixel signal control unit controls the number of the pixel signals having the positive polarity with respect to a center electric potential to be the same as the number of the pixel signals having the negative polarity with respect to the center electric potential within the fixed display period.

6. The display device according to claim 1, wherein the pixel signal control unit controls the polarities of the pixel signals of adjacent pixels so as to be inverted within the fixed display period.

7. The display device according to claim 6, wherein the pixel signal control unit controls the polarities of the pixel signals that are adjacent to each other in a row direction and a column direction so as to be inverted between the fixed display period and another fixed display period next thereto.

8. The display device according to claim 7, wherein the pixel signal control unit controls dot-inversion driving in which the polarity of the pixel signal of the same pixel is inverted between a display period of one screen and a display period of another screen next thereto.

9. The display device according to claim 1, wherein the display functional layer is a liquid crystal layer.

10. The display device according to claim 1,
    wherein the plurality of detection electrodes are disposed on a display surface side of the display functional layer,
    wherein the plurality of driving electrodes are disposed on a side of the display functional layer that is opposite to the display surface, and
    wherein a plurality of pixel electrodes, separated for each pixel, that apply the application voltage to the display functional layer with respect to an electric potential of a corresponding driving electrode used as a reference for each pixel when the pixel signal is supplied are disposed between the display functional layer and the plurality of driving electrodes.

11. The display device according to claim 1, wherein the number of the inverted pulses is equal to the number of not-inverted pulses.

12. The display device according to claim 1, wherein the pixel signal control unit is configured to control the plurality of pixel signals applied to the plurality of pixel signal lines so that pixel signals in 1 H display period have at least one pulse whose polarity is inverted with respect to the display reference electric potential from another pulse in the 1 H display period, while the display reference electric potential is maintained at the constant level in the 1 H display period.

13. The display device according to claim 12, wherein the detection scanning is performed in a period that is different from the 1 H display period.

14. The display device according to claim 1, wherein two pulses of pixel signals, which include a pixel signal before being inverted and a pixel signal after being inverted, are simultaneously applied to a same pixel signal line.

* * * * *